Jan. 24, 1967  J. H. CHMIELEWSKI  3,299,497
DEVICE FOR REMOVING PULLEYS AND THE LIKE FROM SHAFTS
Filed Oct. 11, 1965
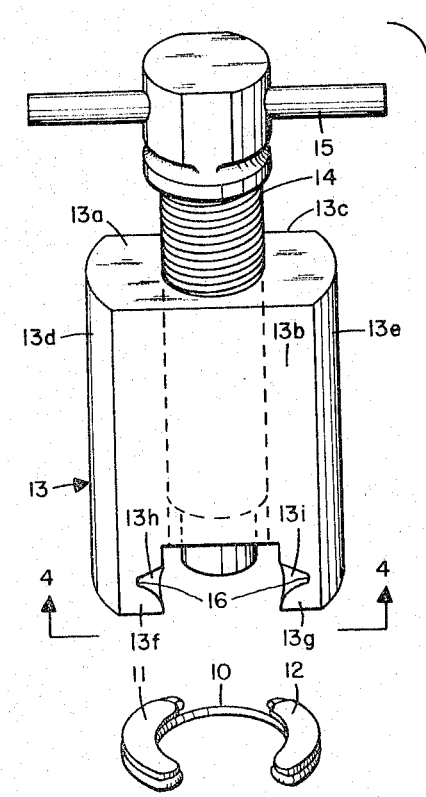
Fig. 1
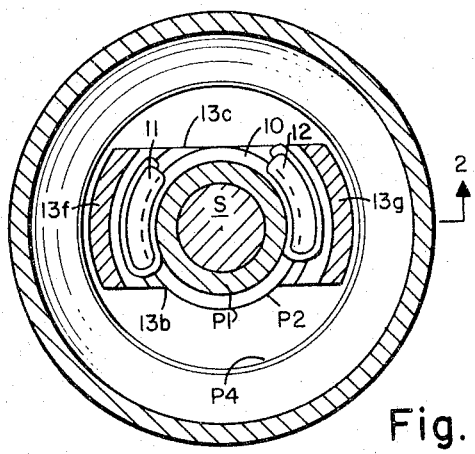
Fig. 3
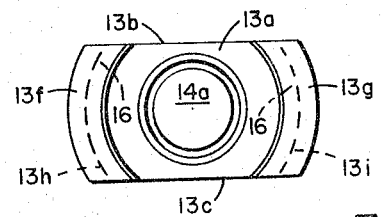
Fig. 4
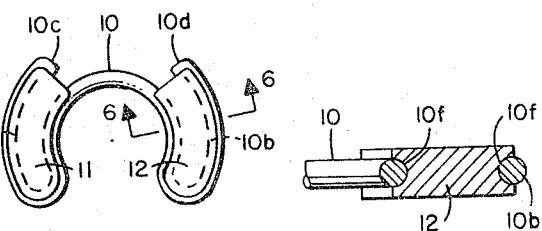
Fig. 5    Fig. 6
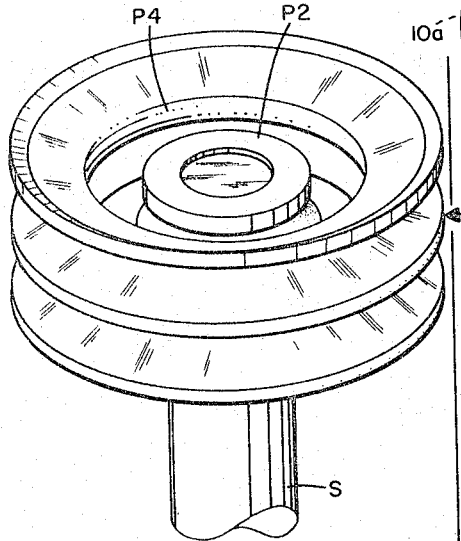
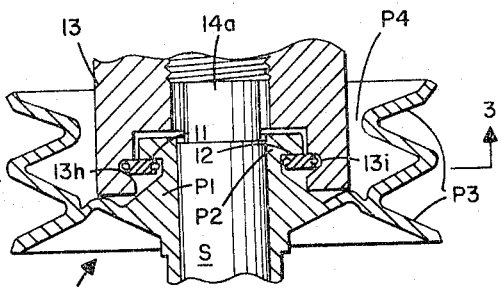
Fig. 2
INVENTOR
JERRY H. CHMIELEWSKI
BY Roy E. Raney
ATTORNEY United States Patent Office 3,299,497
Patented Jan. 24, 1967

3,299,497
DEVICE FOR REMOVING PULLEYS AND THE
LIKE FROM SHAFTS
Jerry H. Chmielewski, 7311 Filbert Lane,
Tampa, Fla. 33610
Filed Oct. 11, 1965, Ser. No. 494,495
3 Claims. (Cl. 29—258)

The present invention relates to devices for forcefully separating a pulley or the like from a shaft to which it is frictionally engaged as by a press fit.

In many instances pulleys or the like having hubs with a radially extending bead about the outer ends thereof are attached to shafts by press fits, and when it is desirable to replace the pulley or the shaft the pulley is forceably removed by a puller device having shoulder means which engages opposite sides of the inner face of the hub bead and is forced axially outwardly to draw the pulley from the shaft by a power multiplying device, such as a screw which engages the end of the shaft. In the case of automobile engine generators and alternators, for example, a drive pulley is generally provided in which the space between the bead on the hub thereof and the annular wall comprising the drive belt groove of the pulley is relatively restricted and the shoulder portion of the puller device for engaging the hub bead is necessarily of relatively thin material because it must be manipulated laterally of the hub to engage the pulley bead, and this material eventually deforms under the high pressures applied thereto and the device no longer locks with the hub and is rendered useless.

The principal object of the present invention is the provision of a device for removing pulleys and the like of the type mentioned comprising a hub bead engaging member which may be readily connected to the bead of the pulley hub without movement thereof laterally of the axis of the hub so that its parts may be of relatively substantial and sturdy construction so as not to deform under the pressures and forces involved.

In carrying out the invention, the puller device has two relatively heavy opposed abutment means which can be inserted between the hub bead and the pulley groove wall and which are engaged by a rotary motion with two plate like lugs temporarily retained between the hub bead and the abutment means and provide a connection between abutments and the bead of the hub for effecting a pulling connection with the hub to effect its removal from the shaft.

A further object of the invention is the provision of a clip member having two opposed radially extending plate-like lugs and which clip can be inserted about a pulley hub beneath the bead thereof and be frictionally retained in position to cause the lugs to form blocks between the bead and radially positioned abutments of a pulling device.

Other objects and advantages of this invention will be apparent from the following description of a preferred form thereof, reference being made to the accompanying drawings wherein:

FIG. 1 is an exploded view of a pulley on a shaft and a device for forcing the pulley from the shaft, the device being shown broken away;

FIG. 2 is a cross sectional view of the pulley taken on line 2—2 of FIG. 3 and showing a blocking lug carrying member installed on the hub of the pulley;

FIG. 3 is a sectional view taken substantially along line 3—3 of FIG. 2;

FIG. 4 is an end view of the device shown in FIG. 1, the view being along line 4—4 of FIG. 1;

FIG. 5 is a plan view of a clip; and

FIG. 6 is a sectional view taken along line 6—6 of FIG. 5 and drawn on a larger scale.

Referring to the drawings, a pulley P is shown which is attached to a shaft S by a press fit. The pulley P is like that commonly used for driving the generators of an automobile and it includes a hub P1 which has a peripheral flange or bead P2 which extends radially from the outer end portion thereof. Annular pulley drive belt grooves P3 are formed about the perimeter of the pulley and include an annular bottom wall P4 which surrounds the hub and restricts access thereto. By engaging the under surfaces of the bead P2 of the pulley P and exerting a pulling force outwardly while retaining the shaft S stationary, the pulley can be forced from the shaft. Until applicant's present invention it has been a problem to provide a device having bead engaging shoulders or abutments which could be positioned between the hub and groove wall and then shifted beneath the bead of the pulley hub and yet have sufficient rigidity to provide resistance to the pulling forces necessarily applied to the pulley.

According to the present invention, applicant provides a spring clip 10 which is generally C-shaped and which can be spread and inserted about the hub P1 beneath the bead P2 and be frictionally retained in such position. The clip 10 carries two flat metal pads or lugs 11, 12 which are generally arcuate in form and are supported in a common plane and at 180° from one another on opposite sides of the clip and are positioned so as to engage the under sides of the bead P2 and extend radially therebeyond, as seen in FIGS. 2 and 3. The lugs 11, 12 may be secured to the clip 10 in any suitable manner, but preferably, the clip has reverse curved portions 10a, 10b which terminate in inturned ears 10c, 10d which, with the clip proper, form resilient loops which embrace the lugs in grooves 10f formed about the edges of each lug, as is illustrated in FIGS. 5, 6. By this arrangement the lugs 11, 12 can be easily replaced in the clip, if necessary.

A pulling device 13 is provided which comprises a generally rectangular body 13a preferably of steel, having opposite flat sides 13b, 13c interconnected by arcuate sides 13d, 13e which form segments of a cylinder the diameter of which is slightly less than the diameter of the pulley wall P4. One end of the body 13a is recessed to form arcuate legs 13f, 13g, the inside end portions of which are grooved as at 16 to form two opposed inwardly extending abutments or shoulders 13h, 13i. The space between the opposed abutments 13h, 13i is greater than the diameter of the hub bead P2 so that the legs 13f, 13g may be inserted by an axial movement between the circular wall P4 and the bead on the pulley hub. The distance between the respective ends of the opposed abutments 13h, 13i is greater than the length of the lugs 11, 12 of the clip 10 so that the legs 13f, 13g can be inserted axially into the space between the hub and walls P4 and straddle the pulley hub and bead P2 while the lugs are in position beneath the bead and extending radially therebeyond and in the space between the ends of the shoulders 13h, 13i. The device 13 may then be turned or rotated 90° so that the lugs 11, 12 are received into the grooves forming the abutments 13h, 13i. It will be seen that the lugs 11, 12 then become wedged between the bead and the abutments so that outward axial force applied to the body 13a is transferred to the pulley hub on opposite sides thereof. The thickness of the lugs 11, 12 is greater than the space between the bead P2 and the shoulders 13h, 13i so that the pulling force is transmitted to the bead in shear through the lugs. The lugs may tend to tilt in the direction of the pull, and such tilting will have no adverse effect because of the resiliency of member 10.

A screw 14 is threaded in a central opening through the body 13a and it may be conveniently rotated by a handle 15 to cause axial travel of the screw. The diameter of the lower end 14a of the screw 14, which extends midway between the shoulders 13h, 13i, is of less diameter than the shaft S and by rotating the screw to move it against the end shaft when the shoulders engage the lugs 11, 12 a substantially pulling effect is produced between the pulley hub and shaft so that the pulley can be forceably removed from the shaft.

By providing the radially extending abutments or lugs 11, 12 between the bead P2 and the abutments 13h, 13i and engaging the abutments with the lugs by the rotary movement described, the thickness of the material in which the abutments are formed can be a maximum because the connection with the lugs is effected by a rotary movement rather than a lateral movement relative to the hub, and accordingly the shoulders will withstand tremendous pulling forces without distortion.

After the pulley is removed, the device 13 can be released therefrom by rotating it relative to the lugs 11, 12 to free the abutments 13h, 13i of the lugs. The spring clip 10 may then be easily removed from beneath the pulley hub bead P2.

By forming the clip 10 of a wire spring and supporting the lugs 11, 12 by encircling a portion thereof by the wire, maximum resiliency of the wire is retained and the pads can be readily replaced should they become weakened or damaged due to long usage. Furthermore, the spring clip can accommodate various diameters of pulley hubs so that a minimum of clips of different sizes is required for uses on a wide variety of pulleys.

Although but one form of the invention has been described with reference to use for removing a pulley from a shaft, it should be understood that it could be used for removing gears, wheels, etc. from shafts, and that other forms, modifications and adaptations of the invention could be made all falling within the scope of the claims which follow.

I claim:

1. A device for removing a pulley or the like from the end of a shaft, the pulley including a hub having a bead thereabout adjacent the end of the shaft, said device comprising a body having two opposed legs extending from one end thereof and adapted to straddle the hub of the pulley and extending inwardly from the end of the pulley shaft and beyond the bead on said pulley, said legs having shoulders thereon extending towards the opposite leg and facing in the direction of said body, a C-shaped member adapted to partially surround said hub adjacent the bead thereon and having two oppositely disposed plate-like lugs extending radially thereof and adapted to be engaged by said shoulders respectively and to engage the inner opposite sides of said bead, means to yieldably support said C-shaped member on said hub, and means to force said body axially from said shaft.

2. A device for removing a pulley or the like from the end of a shaft, the pulley including a hub having a bead thereabout adjacent the end of the shaft, said device comprising a body having two opposed legs extending from one end thereof and adapted to straddle the hub of the pulley and extend inwardly from the end of the pulley shaft and beyond the bead on said pulley, said legs having shoulders thereon extending towards the other leg and facing the attached ends of the legs, a resilient C-shaped spring adapted to frictionally embrace the hub, said spring having two plate-like lugs extending laterally thereof at opposite sides and adapted to rest on said shoulders respectively and extend beneath the bead of the hub and means to force said body axially from said end of said shaft.

3. A device for removing a pulley or the like from the end of a shaft, the pulley including a hub having a bead thereabout adjacent the end of the shaft, said device comprising a body including two opposed legs extending from one end thereof and adapted to straddle the hub of the pulley, the outer end portions of said legs having grooves extending transversely of the insides thereof, the outer sides of said grooves forming shoulders, and resilient C-shaped spring adapted to frictionally embrace the hub, said spring having two plate-like lugs extending laterally thereof at opposite sides and adapted to rest on said shoulders, respectively, and to extend radially inwardly beyond the edges of said shoulders and means to force said body axially from said end of the shaft.

References Cited by the Examiner

UNITED STATES PATENTS

| | | | |
|---|---|---|---|
| 1,172,761 | 2/1916 | Berkstresser | 29—259 |
| 1,347,809 | 7/1920 | Frisz et al. | 29—259 |
| 1,503,129 | 7/1924 | Miles | 29—264 X |
| 2,373,064 | 5/1945 | Stelzer | 29—265 |
| 2,592,420 | 5/1952 | Harrison | 29—265 |
| 2,955,339 | 10/1960 | Richardson | 24—262 |

WILLIAM FELDMAN, *Primary Examiner.*

MYRON C. KRUSE, *Examiner.*